April 2, 1940.  F. J. DALEY  2,195,983
ANTISKID DEVICE
Filed July 1, 1938  2 Sheets-Sheet 1

INVENTOR
Frank J. Daley
by Adolph E. Hugin
Attorney

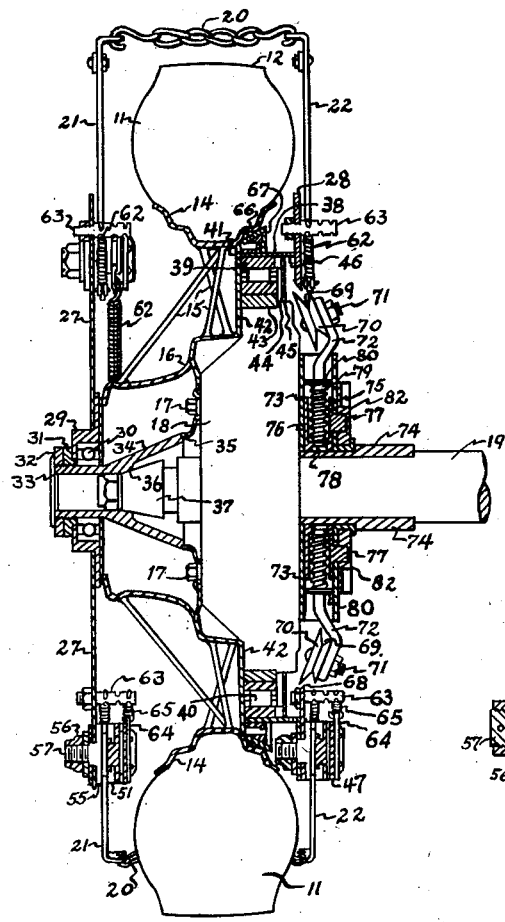

Patented Apr. 2, 1940

2,195,983

UNITED STATES PATENT OFFICE 2,195,983

ANTISKID DEVICE

Frank J. Daley, Schenectady County, N. Y.

Application July 1, 1938, Serial No. 217,054

13 Claims. (Cl. 152—216)

My invention relates to antiskid devices.

An object of my invention is to provide an improved antiskid or traction-increasing arrangement for vehicles, wherein the device is carried by the vehicle when the device is not in use, so that the vehicle wheel or the like can be run with the tread of the wheel in contact with the supporting road surface, and wherein the traction increasing device can be brought into operative relation to the wheel when its use is desirable.

Another object of my invention is to provide an improved antiskid or traction-increasing arrangement for vehicles in which it can be rendered ineffective or effective, from the vehicle and preferably from the operator's seat, as may be required when traversing clear or slippery roads, respectively.

A further object of my invention is to provide an improved power transmitting device for connecting a driving wheel or similar element to a driven antiskid element or similar device.

Further objects and advantages of my invention will become apparent from the following description referring to the accompanying drawings and the features of novelty which characterize my invention will be set forth in the claims appended to and forming a part of this specification.

Figure 1:
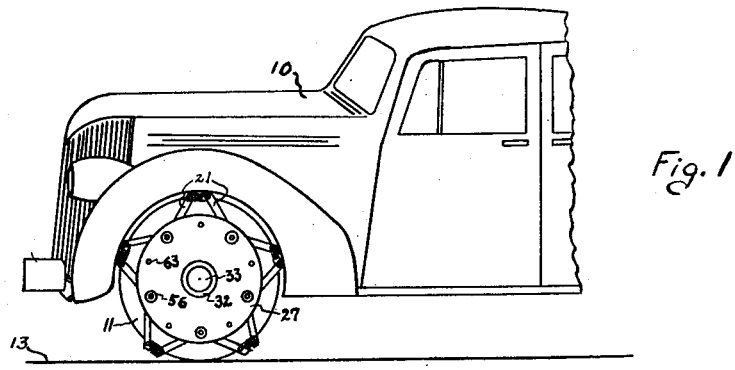
Figure 2:
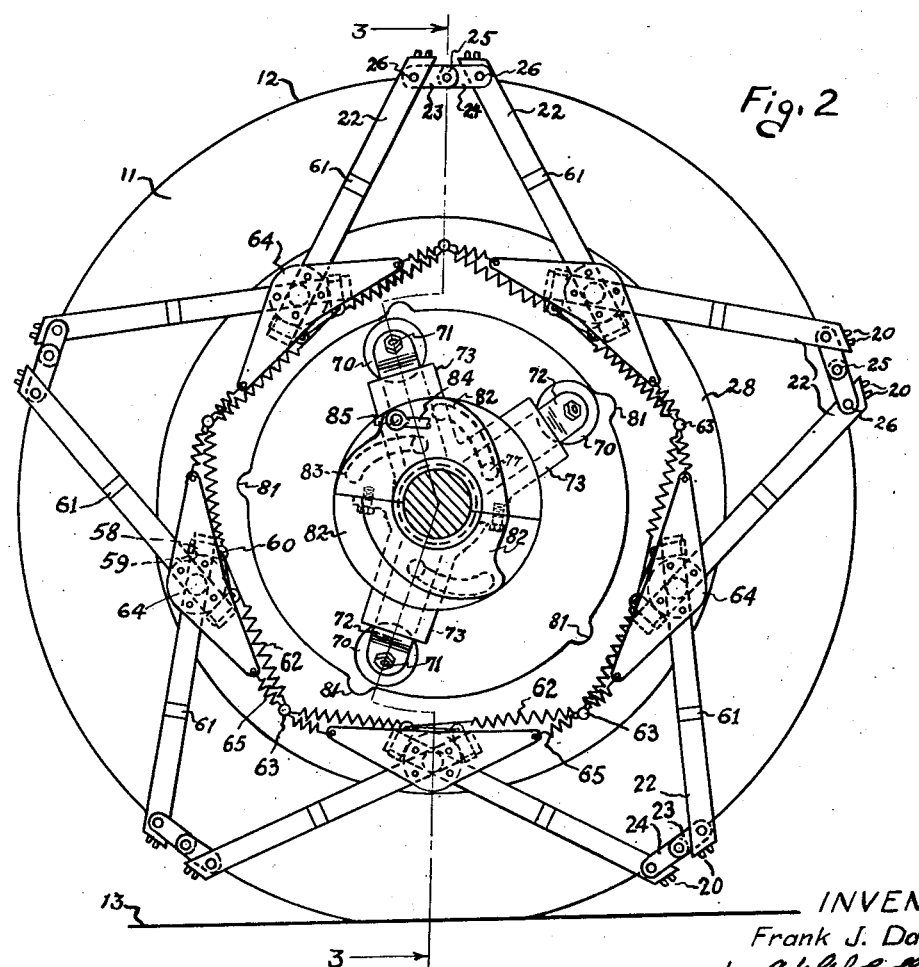

In the accompanying drawings, Fig. 1 is a fragmentary side elevation of an automobile having, on the front wheel thereof, an antiskid device embodying my invention; Fig. 2 is a side elevational view of the inner side of a wheel provided with my antiskid device; Fig. 3 is a sectional view taken on line 3—3 of Fig. 2; Fig. 4 is a fragmentary sectional view illustrating the disengaged position of the clutch shown in Fig. 3; Fig. 5 is a side elevational view of another clutch operating device shown in the position corresponding to the inoperative position of the antiskid device; Fig. 6 is a fragmentary side elevation of clutch operating mechanism, shown in Fig. 5, in the position corresponding to the operative position of the antiskid device; and Fig. 7 is a detail sectional view of a pair of pivoted guide elements for securing the supporting arms to the supporting discs of the antiskid device.

Referring to the drawings, I have shown an automobile 10 provided with wheels 11 having treads 12 on which are arranged antiskid devices which are retained so that the exposed tread of the wheel can run freely over the surface of the road 13 with the antiskid devices latched in inoperative positions; although I have shown my improved device applied to the front wheel of a car, it will be understood that the arrangement is equally applicable to the rear wheels of the vehicle.

The wheel 11 includes a pneumatic tire having the tread 12 which is mounted on a rim 14. The rim 14 is rigidly supported by spokes 15 upon a hub 16 secured by bolts 17 to a brake drum 18 which is rotatably mounted in the usual manner on a spindle or axle 19.

The antiskid device or traction increasing arrangement includes a plurality of chains 20 arranged in circumferentially spaced apart relation about the periphery of the wheel tread 12. These chains are normally retained out of contact with the tread so that the wheel can rotate freely with respect thereto, when the device is inoperative, and when it is operative, it is arranged so that the chains only come in contact with the tread when they contact the road surface as the wheel and device rotate together. As shown in Fig. 2, the chains are spaced apart on opposite sides of the arc of contact between the wheel tread 12 and the surface of the road 13 so that there is no tendency to carry the chains 20 over the arc of contact by the rotation of the wheel. The chains 20 may be made in any suitable manner and may be imbedded in rubber or constructed of other suitable material which will give the desired increase in adhesion between the wheel and the surface of the road when desired.

The chains or traction increasing elements 20 are mounted on flexible steel rods or arms 21 and 22 arranged about the outer and inner sides of the wheel. These supporting arms 21 and 22 are pivotally secured together into pairs adjacent the outer ends thereof by a pair of links 23 and 24. These links are pivotally secured together by a pivot pin 25 and are pivotally secured to the arms 21 and 22 by pivot pins 26. This provides for a slight relative displacement between the ends of adjacent arms as these arms move with respect to each other when the chains 20 contact the road or some obstruction.

In order to support rotatably the antiskid device with respect to the wheel, supporting discs 27 and 28 are arranged on the outer and inner side of the wheel, respectively. The outer disc 27 is secured to an auxiliary hub 29 by welding or the like, and this hub is rotatably supported with respect to the wheel by a set of ball-bearings 30 secured by a nut 31 and a lock nut 32 threadedly engaged at 33 with a supplementary hub 34 secured to the wheel hub 16 by being welded thereto at 35. In order to reenforce the supplementary hub 34, it is supported intermediate the ends thereof at 36 on a conical supporting surface 37 formed on the end of axle 19.

The inner supporting disc 28 is secured by welding to the edge of a cylinder 38 which is secured to the outer race 39 of a set of roller bearings 40. This assembly of the disc 28, cylinder 38, and race 39 is axially movable over the roller bearings 40. In order to prevent the entrance of dust, dirt, or other foreign particles into the roller bearings, I have arranged a dust guard ring 41 secured to a radially extending disc 42 secured to the brake drum 18 and the rim 14. The dust guard ring 41 extends axially about and closely adjacent the outer surface of the cylinder 38. The roller bearings 40 are supported upon a ring 43 arranged about the outer periphery of the brake drum 18. A stationary disc 44 extends about the outer end of the roller bearings 40 to close substantially the space between the two races of these bearings. A second disc or annular plate 45 is secured, as, by welding, to the inner surface of the cylinder 38 in spaced apart relation from the supporting disc 28 in order to further assist in sealing the roller bearings. A plurality of openings 46 are formed in the periphery of the cylinder 38 between the discs 28 and 45 in order to provide for the expulsion of small particles or liquids which may enter between the two discs 28 and 45.

The flexible supporting arms 21 and 22 are pivotally and slidably mounted upon the supporting discs 27 and 28 by guide elements. The inner portions of adjacent arms of adjacent pairs of supporting arms pivotally secured together at the outer ends thereof are slidably mounted in guide openings formed in a pair of guide elements pivotally secured together. The construction of these guide elements may be more readily understood by reference to Figs. 3 and 7. As is shown in these figures, a disc 47 formed with a slot therein through which a flexible supporting arm 21 extends is rotatably supported with one face 49 thereof adjacent a corresponding face 50 of another disc 51. The disc 51 is formed with a stepped axially extending opening 52 through the central portion thereof. Another disc 53 is formed with a shoulder 54 corresponding to the stepped opening 52 in the disc 50. The disc 53 is arranged in rotatable engagement within the opening 52. In assembling these discs the two discs 47 and 51 are placed adjacent one another and the disc 53 is arranged in the opening 52 and is then welded through the central portion thereof to the disc 47. A slotted disc 55 then is rigidly secured to the outer surface of the disc 51. This provides a pair of guide elements pivotally secured together. Each of these pairs of guide elements are then rigidly secured to one of the supporting discs 27 or 28 in openings formed therein by nuts 56 threadedly engaging a hub 57 formed on the outer surface of the disc 55. The inner ends of the supporting arms 21 and 22 then are inserted into guide elements. End stops 58 are secured in notches 59 formed in the ends of the supporting arms and are clamped thereon by pins 60 extending through the ends thereof. A stop 61 also is formed intermediate the ends of each of the supporting arms in order to limit the inward movement of these arms with respect to the guide elements. In order to maintain the supporting arms in their proper relative aligned position, I provide a resilient tension spring 62 secured to the end stops adjacent the inner ends of the supporting arms and to a spring pin 63 mounted on the supporting discs at a point circumferentially spaced intermediate adjacent pairs of guide elements. In order further to insure the proper relative position of the supporting arms, I provide an equalizing yoke 64 secured to one of guide elements. A resilient tension spring 65 is secured to each of the ends of the yoke 64 and to a spring pin 63 adjacent to the respective end of the yoke. The pair of springs 65 exert an equalizing or balancing force upon the yoke 64, and the springs 62 exert a biasing force upon the supporting arms tending to move them outwardly of the guide elements for biasing the traction increasing chains 20 out of engagement with the wheel tread 12.

In order to place the chains 20 in operative relation to the wheel 11, I provide a clutch having a clutch facing 66 rigidly secured upon a disc 67 which is rigidly mounted upon the axially movable cylinder 38. The inner supporting disc is provided with a tapered inner edge 68 adapted to engage correspondingly tapered surfaces of V-grooves 69 of a plurality of V-grooved rollers 70. These V-grooved rollers 70 are rotatably supported by spindles 71 on supporting rods 72 arranged to support these rollers with the V-grooves thereof adjacent the inner periphery of the supporting disc 28. A plurality of cylinders 73 are non-rotatably mounted on the stationary housing 74 of the axle 19. The number of these cylinders corresponds to the number of rollers. A slot 75 is formed longitudinally of each cylinder in the outer side thereof and a cartridge piston 76 is arranged within each cylinder 73 and provided with a projection or lug 77 thereon extending through the slot 75. Each of the roller supporting rods 75 extends into the cylinders 73 and the piston 76, and a screw 78 threadedly engages the inner end of the roller supporting rod and is slidably seated in an opening formed through the head of a piston 76. The rollers and suporting rods are resiliently biased outwardly of the pistons toward the supporting discs 28 by resilient compression springs 79 retained between the inner surfaces of the heads of the pistons 76 and washers 80 secured to the supporting rods 72.

In order to engage and disengage the driving connection between the antiskid device and the wheel, the clutch 66 is adapted to be disengaged and engaged, respectively, with the adjacent surface of the rim 14. As shown in Fig. 3, when the rollers 70 are in the retracted or lower position, the supporting disc 28 is biased inwardly toward the wheel by the tension of the chains 20 pulling inwardly upon the ends of the flexible supporting arms 21 and 22. In this position the clutch 66 drives the discs 27 and 28 which rotate with the wheel 11 and provide an operating driving connection between the wheel and the antiskid chains. When it is desired to place the antiskid device in inoperative position, the clutch surface 66 is disengaged from the rim 14 as shown in Fig. 4. In order thus to disengage the clutch, I provide a plurality of notches 81 formed in circumferentially spaced apart relation in the inner periphery of the supporting disc 28. The number of these notches corresponds to the number of pairs of supporting arms and are arranged with respect to the guide elements so that when the rollers 70 are biased outwardly into engagement with these notches, the chains normally will assume a position such that they will be out of contact with the supporting road surface 13 as shown in Fig. 2. In order to move the rollers into and out of engagement with the notches 81, I provide cam 82, rotatably supported upon the axle bearing housing 74. This cam is arranged adjacent the slots 75 and the cylinders 73 and is provided with curved cam grooves 83 arranged about the projections 77 of the piston 76. An operating rod 84 is pivotally secured by a pivot pin 85 to the cam, and is adapted to be reciprocated by any operating mechanism from the driver's seat in the car. By rotating the cam 82 through the actuation of the rod 84, the projections 77 on the piston 76 are moved inwardly and outwardly from the axle 19, axially of the cylinders 73, thereby biasing the rollers 70 into and out of engagement with the notches 81 in the supporting disc 28. This effects engagement and disengagement of the clutch 66 for driving and arresting the traction increasing elements 20. If, at any time, the wheel encounters an obstruction which engages one of the lower chains 20 adjacent the road surface 13, when the rollers are in normally disengaged driving connection position, the chains and discs will merely turn so that the grooves will pass over the rollers 70 until the wheel has passed such obstruction, and then the rollers 70 will be resiliently biased back into engagement with the next succeeding notch 81 on the disc 28 and again latch the antiskid device in its inoperative position. Thus it is seen that I have provided an improved antiskid device which is readily operable from the driver's seat in a vehicle and which is releasable and may be automatically relatched if the wheel encounters an obstruction. Furthermore, I have provided an improved power transmitting device for transmitting power from the driving wheel to the driven antiskid elements.

In Figs. 5 and 6, I have shown another arrangement for disengaging and engaging the driving connection between the clutch 66 and the wheel rim 14 for placing the antiskid device into operative and inoperative position. The antiskid device used with this arrangement may be similar in all respects to that shown in Figs. 1 to 4, inclusive. The clutch and the supporting discs also are similar to those previously described. Various elements in Figs. 5 and 6 corresponding to elements in Figs. 1 to 4, inclusive, are given the same reference numerals. As in the foregoing description, the inner supporting disc 28 is provided with a plurality of circumferentially spaced apart notches 81 which correspond to the number of pairs of antiskid chains 20. The inner edge of the disc 28 is formed with a tapered surface corresponding to the inner tapered edge 68, that is shown in Figs. 3 and 4, which is adapted to be engaged by correspondingly tapered surfaces of V-grooves formed in three spaced apart V-grooved rollers 70. These rollers 70 are rotatably supported by spindles 86 on bell-cranks 87. One of the arms of each of the bell-cranks 87 is pivotally connected intermediate the ends thereof by a pivot pin 88 to a stationary supporting plate 89. The lower surface 90 of each of the pivotally connected arms of the bell-cranks 87 is formed as a cam and is adapted to cooperate with a cam element comprising a plate 91 rotatably supported about the axle housing 74. Three other bell-cranks 92 are pivotally secured by pivot pins 93 to the rotatable supporting cam plate 91 and are arranged to engage the cam surface 90 of the roller supporting bell-cranks 87. Each of the bell-cranks 92 are formed with a cartridge arm 94, which forms a spring seat for a compression coil spring arranged partially within the cartridge arm 94 and bearing against a spring seat 96 secured to the cam supporting plate 91. This provides a resilient arrangement for biasing the bell-cranks 92 into engagement with the cam surfaces 90 on the bell-cranks 87. Each of the inner ends of the pivoted arms of the bell-cranks 87 is formed with inwardly projecting stops 97. In order to move the rollers into and out of engagement with the adjacent inner surface of the supporting disc 28, an operating rod 84 is pivotally secured by a pivot pin 85 to the supporting plate 91, and is adapted to be reciprocated by any suitable operating mechanism from the driver's seat in the car. As shown in Fig. 5, the rollers 70 are resiliently biased into engagement with the notches 81 of the supporting disc 28 by the bell-cranks 92, when these bell-cranks engage the cam surfaces 90 adjacent the roller supporting ends of the bell-cranks 87. By rotating the cam supporting plate 91 through the actuation of the rod 84, the bell-cranks 92 will be rotated to the position shown in Fig. 6 into engagement with the cam surfaces 90 adjacent the pivoted ends of the bell-cranks 87. Since these ends of the bell-cranks 87 are on opposite sides of pivot pins 88 from the rollers 70, this movement of the cam supporting plate 91 causes the bell-cranks 87 to pivot in a direction so as to disengage the rollers 70 from the notches 81, thereby releasing the supporting disc 28. This affects the engagement of clutch 66, as has been explained with respect to Figs. 1 to 4, inclusive. Thus it is seen that I have provided another power transmitting device and a controlling arrangement therefor for transmitting power from a driving wheel to a driven antiskid device.

While I have illustrated and described particular embodiments of my invention, modifications thereof will occur to those skilled in the art. I desire it to be understood therefore that my invention is not to be limited to the particular arrangements disclosed, and I intend in the appended claims to cover all modifications which do not depart from the spirit and the scope of my invention.

What I claim as new and desire to secure by Letters Patent of the United States is:

1. An antiskid device for a vehicle wheel having a tread including a plurality of elements arranged about said tread and adapted to increase the traction of said wheel, means including elements for supporting said traction increasing means rotatably with respect to said wheel, a plurality of grooved rollers, a stationary supporting plate, means for rotatably supporting said rollers adjacent one of said supporting elements, means including a cam associated with each of said roller supporting means for pivotally and resiliently biasing said rollers toward said one supporting element, a pivoted crank arranged to engage each of said cams, and means arranged to support said cranks adapted to vary the engagement of said cranks with said cams to move said rollers into and out of engagement with said supporting element for driving and arresting said traction increasing elements.

2. An antiskid device for a vehicle wheel having a tread including a plurality of elements arranged about said tread and adapted to increase the traction of said wheel, means including supporting elements extending about said wheel for carrying said traction increasing means rotatably with respect to said wheel, means axially movable of said wheel for providing a driving connection between said supporting means and said wheel, a plurality of rollers rotatably supported adjacent one of said supporting elements, a plurality of non-rotatable cylinders corresponding to said plurality of rollers, means slidably mounted in each of said cylinders for limited movement axially thereof, means for resiliently biasing said rollers outwardly of said slidable means toward one of said supporting elements, and means arranged to move said slidable means axially thereof and to move said rollers into and out of engagement with one of said supporting elements for engaging and disengaging said driving connection with said wheel for driving and arresting said traction increasing elements.

3. An antiskid device for a vehicle wheel having a tread including a plurality of elements arranged about said tread and adapted to increase the traction of said wheel, means including elements for supporting said traction increasing means rotatably with respect to said wheel, means for providing a driving connection between said wheel and said supporting means, a controlling device including a plurality of rollers adapted to cooperate with said supporting means for controlling engagement and disengagement of said driving connection, means for rotatably supporting said rollers adjacent one of said supporting elements, means including a cam associated with each of said roller supporting means for moving said rollers toward and away from said one supporting element, and means arranged to operate said cams to move said rollers into and out of engagement with said supporting element for engaging and disengaging said driving connection for driving and arresting said traction increasing elements.

4. An antiskid device for a vehicle wheel including a plurality of elements adapted to be arranged about the wheel to increase the traction thereof, means for supporting said elements about the wheel, means axially movable of said wheel for providing a driving connection between said wheel and elements, a plurality of grooved rollers rotatably supported with grooves adjacent said axially movable means, a plurality of non-rotatable cylinders corresponding to said plurality of rollers, a piston slidably mounted in each of said cylinders for limited movement axially thereof, means for resiliently biasing said rollers outwardly of one of said pistons toward said axially movable means, means including a cam arranged to cooperate with said pistons for moving said pistons axially thereof in said cylinders, and means arranged to operate said cam to move said pistons axially thereof and to move said rollers into and out of engagement with said axially movable means for engaging and disengaging said driving connection.

5. An antiskid device for a vehicle wheel including a plurality of elements adapted to be arranged about the wheel to increase the traction thereof, means for supporting said elements about the wheel, means rotatably and axially movable of said wheel secured to said elements for providing a driving connection therebetween, a plurality of grooved rollers, a stationary supporting plate, means for rotatably supporting said rollers adjacent said axially movable means, means including a cam associated with each of said roller supporting means for pivotally biasing said rollers toward said axially movable means, a pivoted crank arranged to engage each of said cams, and means arranged to support said pivoted cranks adapted to vary the engagement of said cranks with said cams to move said rollers into and out of engagement with said axially movable means for engaging and disengaging said driving connection.

6. An antiskid device for a vehicle wheel having a tread including a plurality of elements arranged about said tread and adapted to increase the traction of said wheel, means including elements for supporting said traction increasing means rotatably with respect to said wheel, means for providing a driving connection between said wheel and said supporting means, a controlling device including a plurality of rollers adapted to cooperate with said supporting means for controlling engagement and disengagement of said driving connection, a plurality of non-rotatable cylinders corresponding to said plurality of rollers, means slidably mounted for limited movement axially of said cylinders, and means arranged to operate said slidable means axially thereof and to move said rollers into and out of engagement with one of said supporting elements for engaging and disengaging said driving connection with said wheel for driving and arresting said traction increasing elements.

7. An antiskid device for a vehicle wheel including a plurality of elements adapted to be arranged about said wheel and adapted to increase the traction thereof, a supporting disc arranged on each side of said wheel, means for rotatably supporting one of said discs with respect to said wheel on one side thereof, other means for rotatably supporting the other of said discs with respect to said wheel on the other side thereof, means including a clutch secured to said other of said discs and axially movable of said other rotatably supporting means for providing a driving connection between said supporting discs and said wheel, means including a plurality of flexible supporting arms arranged on each side of said wheel and secured to said traction increasing elements and to said clutch for resiliently biasing said clutch toward said wheel to provide a driving connection therewith, resilient means for biasing said supporting arms outwardly and for biasing said traction increasing elements out of engagement with said wheel, and an operating device for engaging and disengaging said clutch with said wheel for driving and arresting said traction increasing elements.

8. An antiskid device for a vehicle wheel having a tread including a plurality of elements arranged about said tread and adapted to increase the traction of said wheel, a supporting disc arranged on each side of said wheel, means for providing a driving connection between one of said supporting discs and said wheel, a plurality of supporting arms arranged on each side of said wheel and secured to said traction increasing elements, means including a pair of guide elements pivotally secured together and provided with guide openings therein for slidably mounting therein the inner portions of said supporting arms, means for pivotally securing said guide elements to said supporting discs, resilient means for biasing said supporting arms outwardly of said guide elements and for biasing said traction increasing elements out of engagement with said wheel tread, and means for engaging and disengaging said driving connection with said wheel for driving and arresting said traction increasing elements.

9. An antiskid device for a vehicle wheel having a tread including a plurality of elements arranged about said tread and adapted to increase the traction of said wheel, a supporting disc arranged on each side of said wheel, means for rotatably supporting said discs with respect to said wheel, means for providing a driving connection between one of said supporting discs and said wheel, a plurality of notches formed at circumferentially spaced apart points on the inner periphery of one of said supporting discs, a plurality of rollers rotatably supported adjacent said inner notched periphery of said supporting disc, means for resiliently biasing said rollers toward said notched periphery of said supporting disc, and means for moving said rollers into and out of engagement with said notches in said supporting discs and for engaging and disengaging said driving connection with said wheel for driving and arresting said traction increasing elements.

10. An antiskid device for a vehicle wheel including a plurality of elements adapted to be arranged about said wheel and adapted to increase the traction thereof, a supporting disc arranged on each side of said wheel, means for rotatably supporting one of said discs with respect to said wheel on one side thereof, other means for rotatably supporting the other of said discs with respect to said wheel on the other side thereof, means including a clutch secured to said other of said discs and axially movable of said other rotatably supporting means for providing a driving connection between said other of said supporting discs and said wheel, an operating device including a plurality of rollers, means for rotatably supporting said rollers adjacent one of said supporting discs, and means for moving said rollers axially of said wheel for engaging and disengaging said clutch with said wheel for driving and arresting said traction increasing elements.

11. An antiskid device for a vehicle wheel having a tread including a plurality of elements adapted to be arranged about said tread and adapted to increase the traction of said wheel, a supporting disc arranged on each side of said wheel, a plurality of flexible supporting arms on each side of said wheel secured to said traction increasing elements, means including a pair of guide elements secured together and provided with guide openings therein for slidably mounting therein the inner portions of said supporting arms, means for pivotally securing said guide elements to said supporting discs at circumferentially spaced apart points, each of said pairs of guide elements on one of said supporting discs being secured thereto in a substantially axially aligned position with another of said pairs of guide elements on the other of said supporting discs, means including a resilient tension spring secured to each of said supporting arms and to said supporting discs for centering said supporting arms, and an operating device for driving and arresting said traction increasing elements.

12. An antiskid device for a vehicle wheel having a tread including a plurality of elements arranged about said tread and adapted to increase the traction of said wheel, means including elements for supporting said traction increasing means rotatably with respect to said wheel, means for providing a driving connection between said wheel and said supporting means, and means including a plurality of rollers adapted to cooperate with said supporting means for controlling engagement and disengagement of said driving connection, said controlling means being releasable when said driving connection is disengaged upon said wheel encountering an obstruction for engaging said driving connection, said roller controlling means being arranged to disengage said driving connection when said wheel has passed such obstruction.

13. An antiskid device for a vehicle wheel having a tread including a plurality of elements arranged about said tread and adapted to increase the traction of said wheel, means including elements for supporting said traction increasing means rotatably with respect to said wheel, means including a plurality of rollers adapted to cooperate with said supporting means for controlling engagement and disengagement of said driving connection, said controlling means being releasable when said driving connection is disengaged upon said wheel encountering an obstruction for engaging said driving connection, said roller controlling means being arranged to disengage said driving connection when said wheel has passed such obstruction, and cam means for actuating said roller control means.

FRANK J. DALEY.